US012681863B2

(12) United States Patent
Kim et al.

(10) Patent No.: US 12,681,863 B2
(45) Date of Patent: Jul. 14, 2026

(54) CACHE PROCESSING REQUEST FOR DATA STORED IN STACK AREA BY USING USELESS INFORMATION, OPERATING METHOD OF CACHE, AND ELECTRONIC DEVICE COMPRISING CACHE

(71) Applicant: SAMSUNG ELECTRONICS CO., LTD., Suwon-si (KR)

(72) Inventors: Moongyung Kim, Suwon-si (KR); Donghyeon Ham, Suwon-si (KR); Youngsik Eom, Suwon-si (KR); Euiyeon Won, Suwon-si (KR); Ara Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 18/609,664

(22) Filed: Mar. 19, 2024

(65) Prior Publication Data

US 2024/0320159 A1 Sep. 26, 2024

(30) Foreign Application Priority Data

Mar. 24, 2023 (KR) ........................ 10-2023-0038959
May 8, 2023 (KR) ........................ 10-2023-0059419

(51) Int. Cl.
*G06F 12/08* (2016.01)
*G06F 12/0891* (2016.01)
*G06F 12/0895* (2016.01)

(52) U.S. Cl.
CPC ...... *G06F 12/0891* (2013.01); *G06F 12/0895* (2013.01)

(58) Field of Classification Search
CPC ............. G06F 12/0891; G06F 12/0895; G06F 12/0804; G06F 12/0864; G06F 12/126; G06F 2212/451; G06F 2212/502
See application file for complete search history.

(56) References Cited

U.S. PATENT DOCUMENTS

| | | | |
|---|---|---|---|
| 6,151,661 A | 11/2000 | Adams, III et al. | |
| 7,065,613 B1 | 6/2006 | Flake et al. | |
| 7,203,798 B2 | 4/2007 | Kawamoto | |
| 7,702,855 B2 | 4/2010 | Rosen et al. | |
| 10,541,042 B2 * | 1/2020 | Nelson ................ | G06F 11/3698 |
| 2004/0024970 A1 | 2/2004 | Chauvel et al. | |

(Continued)

FOREIGN PATENT DOCUMENTS

| | | |
|---|---|---|
| JP | H04268638 | 9/1992 |
| JP | H05143330 | 6/1993 |

(Continued)

*Primary Examiner* — Tracy C Chan
(74) *Attorney, Agent, or Firm* — Morgan, Lewis & Bockius LLP

(57) ABSTRACT

A cache includes a data memory, a tag memory, and a cache controller. The data memory includes a stack area storing, in a stack structure, data used by an external processor in a plurality of cache lines. The tag memory stores a tag entry including useless information indicating whether data stored in a corresponding cache line has been popped. The cache controller is configured to, when a pop request for data stored in the stack area is received, change the useless information of a cache line storing the data subject to the pop request, to a useless state.

16 Claims, 10 Drawing Sheets

(56) References Cited

U.S. PATENT DOCUMENTS

| | | | | |
|---|---|---|---|---|
| 2004/0148468 | A1* | 7/2004 | Hooker | G06F 12/1054 |
| | | | | 712/E9.023 |
| 2004/0186959 | A1* | 9/2004 | Kawamoto | G06F 12/0875 |
| | | | | 711/132 |
| 2007/0038810 | A1* | 2/2007 | Rosen | G06F 9/30134 |
| | | | | 712/E9.023 |
| 2012/0159077 | A1* | 6/2012 | Steely, Jr. | G06F 12/0804 |
| | | | | 711/E12.044 |
| 2015/0293847 | A1 | 10/2015 | Patsilaras et al. | |
| 2019/0340103 | A1* | 11/2019 | Nelson | G06F 11/3636 |
| 2024/0320159 | A1* | 9/2024 | Kim | G06F 12/0864 |

FOREIGN PATENT DOCUMENTS

| | | |
|---|---|---|
| JP | H06028253 | 2/1994 |
| JP | H09231133 | 9/1997 |
| JP | 2001222467 | 8/2001 |

* cited by examiner

FIG. 3

|  |  |  |  |  |  |
|---|---|---|---|---|---|
| TAG MEMORY _220 |
| TAG ENTRY _221 |
| VALID | DIRTY | SHARED | USELESS | TAG ADDRESS | ··· |
| TAG ENTRY |
| TAG ENTRY |
| ⋮ |
| TAG ENTRY |
| TAG ENTRY |

PUSH REQUEST

POP REQUEST

CACHE PROCESSING REQUEST FOR DATA STORED IN STACK AREA BY USING USELESS INFORMATION, OPERATING METHOD OF CACHE, AND ELECTRONIC DEVICE COMPRISING CACHE

CROSS-REFERENCE TO RELATED APPLICATION

This U.S. patent application claims priority under 35 U.S.C. § 119 to Korean Patent Application Nos. 10-2023-0038959, filed on Mar. 24, 2023, and 10-2023-0059419, filed on May 8, 2023, in the Korean Intellectual Property Office, the disclosures of which are incorporated by reference in their entireties herein.

1. TECHNICAL FIELD

The inventive concept relates to a cache for processing a request for data stored in a stack area.

2. DISCUSSION OF RELATED ART

A processor included in an electronic device uses a cache to process data at a high speed. The cache may be arranged between a main memory and a processor included in the electronic device and may store data frequently accessed by the processor from among data stored in the main memory. The cache has a small capacity but may process data at a high speed.

A stack is a data structure that serves as a collection of elements with two main operations, a push that adds an element to the collection and a pop that removes the most recently added element. The cache may include a stack area corresponding to the stack for storing data, such as a register used by the processor. The processor may write data in the stack area of the cache through a push request that performs the push and read data from the stack area of the cache through a pop request that performs the pop. When data transferred to the processor by the pop request is discarded without being reused by the processor, the data may not be deleted within the cache. However, because the cache may not recognize that the popped data has been discarded, the cache may perform an unnecessary operation on the popped data, such as writing back the popped data to the main memory. In addition, the cache may transfer the popped data in response to a read request for the popped data from another device, thereby causing a security problem.

SUMMARY

At least one embodiment of the inventive concept provides a cache for managing popped data by using useless information.

According to an aspect of the inventive concept, a cache includes a data memory, a tag memory, and a cache controller. The data memory includes a stack area storing, in a stack structure, data used by an external processor in a plurality of cache lines. The tag memory is for storing a tag entry including useless information indicating whether data stored in a corresponding cache line has been popped. The cache controller is configured to, when a pop request for data stored in the stack area is received, change the useless information of a cache line storing the data subject to the pop request, to a useless state.

According to an aspect of the inventive concept, an operating method of a cache including a data memory including a stack area storing data in a stack structure, a tag memory, and a cache controller is provided. The method includes: receiving, by the cache controller, a pop request from a processor; and changing, by the cache controller, useless information in the tag memory of a cache line storing data subject to the pop request, to a useless state, wherein the useless information indicates whether data stored in a corresponding cache line has been popped.

According to an aspect of the inventive concept, an electronic device includes a main memory, a cache, and a processor. The cache includes a data memory, a tag memory, and a cache controller. The data memory includes a stack area storing, in a stack structure, data used by the processor in a plurality of cache lines. The tag memory is for storing a tag entry including information about the data stored in the stack area. The cache controller is configured to process a request for the data stored in the stack area based on the tag entry. The tag entry includes useless information indicating whether data stored in a corresponding cache line has been popped. The cache controller is further configured to, when a pop request for the data stored in the stack area is received, change the useless information of a cache line storing the data subject to the pop request, to a useless state.

BRIEF DESCRIPTION OF THE DRAWINGS

Embodiments of the inventive concept will be more clearly understood from the following detailed description taken in conjunction with the accompanying drawings in which:

FIG. 3 is a diagram illustrating a detailed structure of a tag memory included in a cache according to an embodiment;

DETAILED DESCRIPTION OF THE EMBODIMENTS

Hereinafter, embodiments are described in detail with reference to the accompanying drawings.

Figure 1:
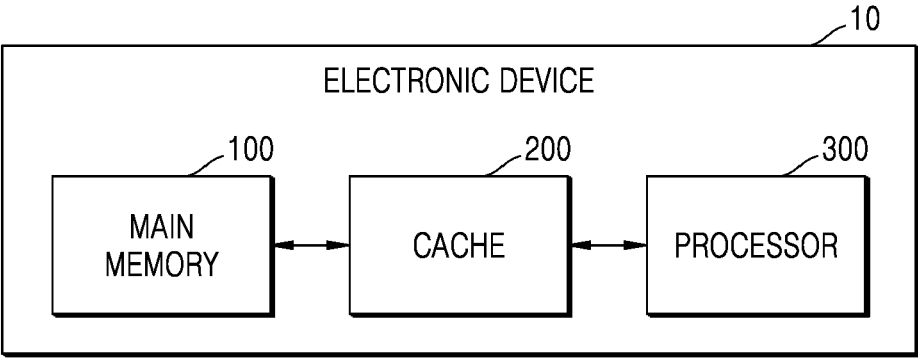
FIG. 1 is a block diagram of an electronic device according to an embodiment.

FIG. 1 is a block diagram of an electronic device 10 according to an embodiment.

Referring to FIG. 1, the electronic device 10 according to an embodiment includes a main memory 100, a cache 200, and a processor 300.

In an embodiment, the electronic device 10 may be any of smartphones, tablet personal computers (PCs), smart televisions (TVs), mobile phones, personal digital assistants (PDAs), laptops, media players, microservers, global positioning system (GPS) devices, electronic book terminals, digital broadcasting terminals, navigations, kiosks, moving picture experts group layer-3 (MP3) players, digital cameras, home appliances, and other mobile or non-mobile computing devices. However, the inventive concept is not limited thereto. In addition, the electronic device 10 may be wearable devices, such as watches, glasses, hairbands, and rings having a data processing function. However, the inventive concept is not limited thereto, and the electronic device 10 may include devices of all types that operate based on an operating system (OS) by using a processor.

In an embodiment, the main memory 100, the cache 200, and the processor 300 included in the electronic device 10 are implemented on a single system-on-chip (SoC) within the electronic device 10.

The main memory 100 may store data used by the processor 300. The main memory 100 may include a non-volatile memory, including static random access memory (SRAM), dynamic random access memory (DRAM), etc. However, the inventive concept is not limited thereto, and the main memory 100 may include any type of memory accessible by the processor 300, for example, a non-volatile memory, such as flash memory, phase-change random access memory (PRAM), magnetic random access memory (MRAM), and ferroelectric random access memory (Fe-RAM).

The cache 200 may store some of the data stored in the main memory 100. In an embodiment, a capacity of the cache 200 for storing data is less than a capacity of the main memory 100. In an embodiment, a physical characteristic of the cache 200 differs from the main memory 100 to enable data to be written to or read from the cache 100 more quickly than the main memory 100. The cache 200 may be implemented as a volatile memory (e.g., SRAM), but the inventive concept is not limited thereto. A structure and operations of the cache 200 may be described in greater detail with reference to FIG. 2.

The processor 300 may control the overall operation of the electronic device 10. In an embodiment, the processor 300 may be a central processing unit (CPU).

The processor 300 may store some internally used data in the cache 200. The processor 300 may transmit a push request for the data to the cache 200 and store the data in a stack area of the cache 200. For example, the processor 300 may store data registered in an internal register in the cache 200 through a push request.

In addition, the processor 300 may transmit a pop request for data to the cache 200 to retrieve the data stored in the stack area of the cache 200. For example, the processor 300 may retrieve data temporarily stored in the cache 200 through the pop request. The push request may be an electronic message that includes a command for instructing the cache 200 to store first data in the stack area. The pop request may be an electronic message that includes a command for instructing the cache 200 to output the first data from the stack area to the processor 300.

Figure 2:
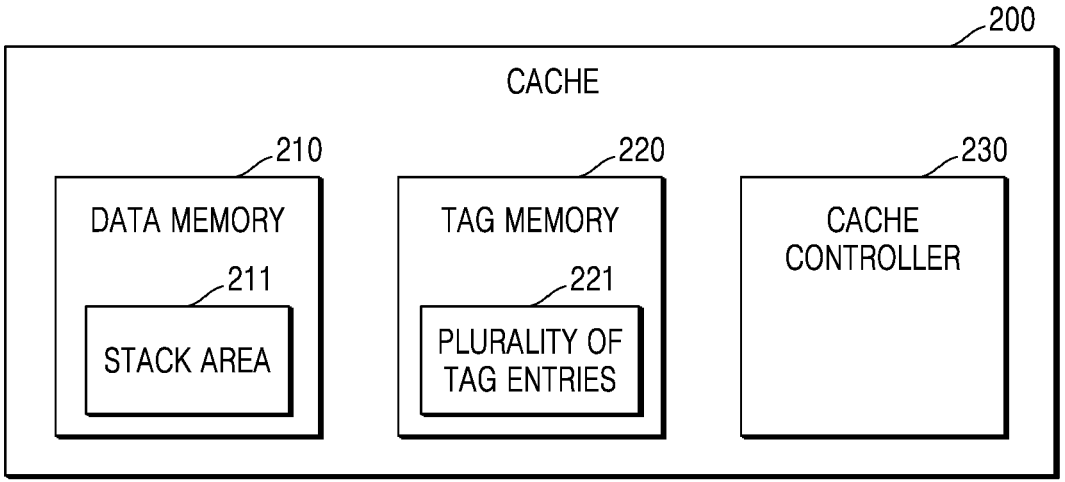
FIG. 2 is a block diagram of a cache according to an embodiment.

FIG. 2 is a block diagram of the cache 200 according to an embodiment.

Referring to FIG. 2, the cache 200 according to an embodiment includes a data memory 210, a tag memory 220, and a cache controller 230 (e.g., a controller circuit).

The data memory 210 may store some of the data stored in the main memory 100 and some of the data used within the processor 300. The data memory 210 may include a plurality of cache lines.

The data memory 210 may include a stack area 211. The stack area 211 may include some of the plurality of cache lines and may store the data used by the processor 300 in the plurality of included cache lines in a stack structure.

The tag memory 220 may store information about data stored in the data memory 210.

The tag memory 220 may store a plurality of tag entries 221. Structures of the plurality of tag entries are described in greater detail with reference to FIG. 3.

Figure 3:
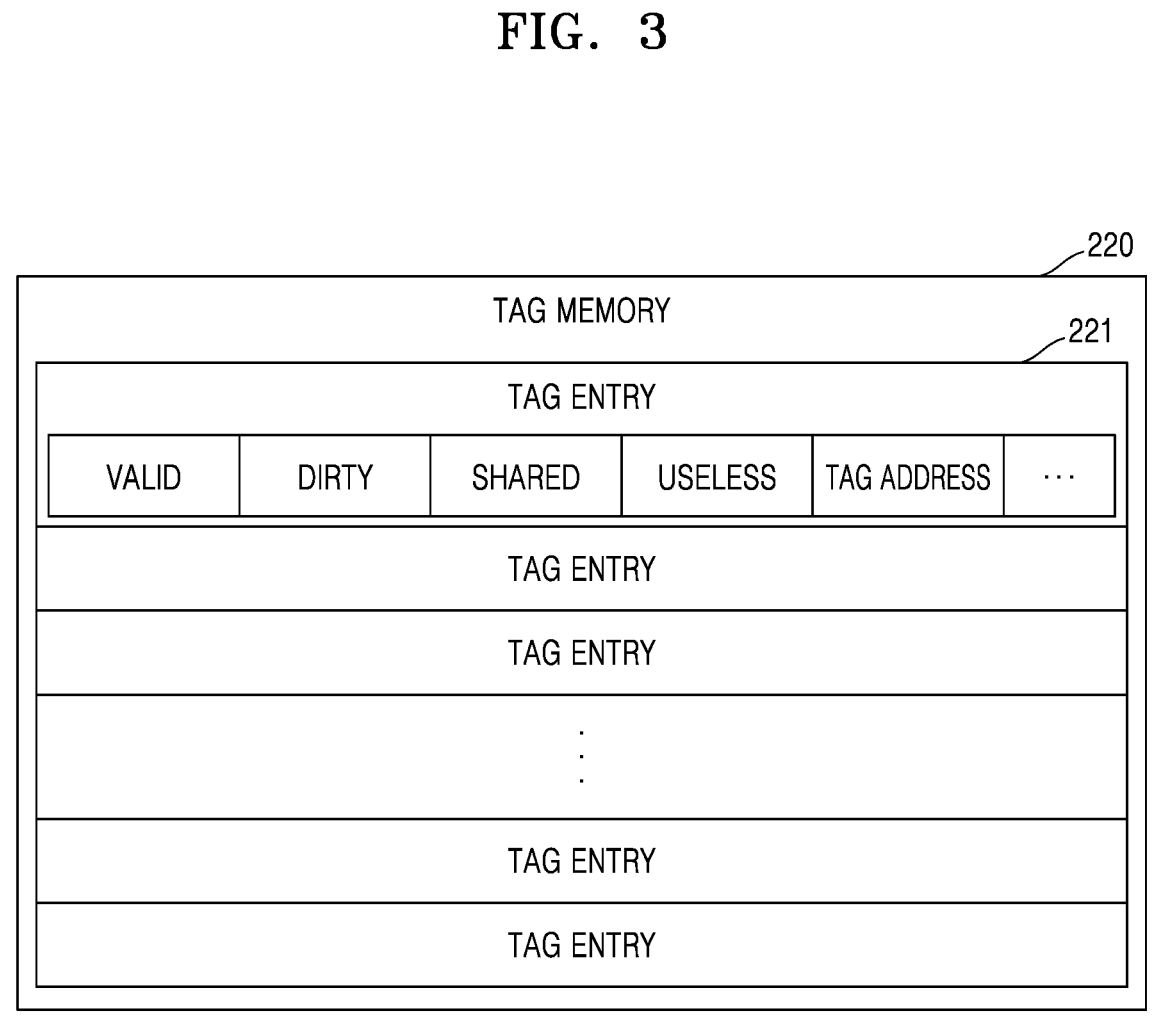

FIG. 3 is a diagram illustrating a detailed structure of the tag memory 220 included in the cache 200, according to an embodiment.

Referring to FIG. 3, the plurality of tag entries 221 included in the tag memory 220 according to an embodiment may be identified. Each of the plurality of tag entries 221 may store information about data stored in a corresponding cache line from among the plurality of cache lines.

In an embodiment, each of the plurality of tag entries 221 includes valid information, dirty information, shared information, useless information, and a tag address.

The valid information may indicate whether data stored in a corresponding cache line is valid. For example, when the valid information is in a valid state, it may indicate that data stored in a corresponding cache line is valid data. In another example, when the valid information is in an invalid state, it may indicate that the data stored in the corresponding cache line is invalid data. For example, a computer program may be allowed to process valid data but prevented from processing invalid data.

The dirty information may indicate whether data stored in a corresponding cache line is different from data stored in the main memory 100. For example, when the dirty information is in a dirty state, it may indicate that the data stored in the corresponding cache line is different from the data stored in the main memory 100. In another example, when the dirty information is in a clean state, it may indicate that the data stored in the corresponding cache line is identical to the data stored in the main memory 100. For example, if a computer program is operating on a variable storing variable data, the variable data has a first value in the main memory 100 and a second other value in the cache 200, the dirty information for the variable data would be in a dirty state.

The shared information may indicate whether data stored in a corresponding cache line is data shared by caches other than itself. For example, when the shared information is in a shared state, it may indicate that the data stored in the corresponding cache line is data shared by caches other than itself. In another example, when the shared information is in a non-shared state, it may indicate that the data stored in the corresponding cache line is data not shared by caches other than itself.

The useless information may indicate whether data stored in a corresponding cache line has been popped. For example, when the useless information is in a useless state, it indicates that the data stored in the corresponding cache line has been popped. For example, if a computer program is currently processing an instruction that needs to perform an operation on the variable data stored in the stack area 211, the computer program might request a pop of the variable data from the stack area 211 to read the variable data and then execute the operation on the read or popped variable data. The pop request may cause the useless information associated with the variable data to be set to the useless state. For example, if the computer program no longer needs the variable data after executing the operation, the variable data is no longer useful to the computer program. In another example, when the useless information is in a useful state, it indicates that the data stored in the corresponding cache line is data that has not been popped. For example, if the computer program has not yet reached the instruction that needs to perform an operation on the variable data stored in the stack area 211, the useless information may remain in the useful state since the computer program may still need to use the variable data.

The tag address may be information for converting a virtual address included in a request for a corresponding cache line into a physical address.

Referring to FIG. 2 again, the cache controller 230 may control the overall operation of the cache 200. In an embodiment, the cache controller 230 is implemented as a finite state machine (FSM).

The cache controller 230 may perform an operation corresponding to a request received from the processor 300.

The cache controller 230 may receive, from the processor 300, a pop request to read data stored in a stack area 211. When the pop request for the data stored in the stack area 211 is received, the cache controller 230 may change useless information of a cache line subject to the pop request into a useless state.

In response to the pop request received from the processor 300, the cache controller 230 may output the data stored in the stack area 211 to the processor 300. In this case, the cache controller 230 may output, to the processor 300, the data of the stack area 211 subject to the pop request.

Then, the cache controller 230 may change useless information of a cache line storing data subject to the pop request into a useless state. When the cache controller 230 changes the useless information of the cache line storing the data subject to the pop request into the useless state, an unnecessary operation, such as writing back the popped data based on the useless information, is not performed. A computer program could load first variable data of a variable stored in the main memory 100 at a first time, change the first variable data to second other variable data at a second time, store the second variable data in the cache 200 at a third time, and then perform a write back to overwrite the variable stored in the main memory 100 with the second variable data at a fourth time. However, this write back is not performed if the second variable data is located in the stack area 211 and its useless information indicates it is in a useless state. The write back may still be performed if the second variable data is located in the stack area 211 and its useless information indicates it is in a useful state.

The cache controller 230 may receive, from the processor 300, a push request to write data in the stack area 211. When the push request for the stack area is received, the cache controller 230 may change valid information of a cache line to store data subject to the push request into a valid state and change dirty information of the cache line to store the data subject to the push request into a dirty state. For example, when the processor 300 desires to change the first variable data of the variable of the main memory 100 to the second variable data, the processor 300 may output the push request so that the second variable data is stored in the stack area 211 of the cache 200. Since the variable still has the first variable data in the main memory 100, the dirty information is set to the dirty state.

In response to the push request received from the processor 300, the cache controller 230 may write the data subject to the push request in the stack area 211.

Then, the cache controller 230 may change valid information of a cache line to store the data subject to the push request into a valid state. Accordingly, the cache controller 230 may identify that the cache line to store the data subject to the push request stores valid data. For example, the cache line to store the second variable data of the variable may have an invalid state until the writing of the second variable data to the cache line has completed successfully.

In addition, the cache controller 230 may change dirty information of a cache line to store the data subject to the push request into the dirty state. Accordingly, the cache controller 230 may identify that data stored in the cache line to store the data subject to the push request is different from the data stored in the main memory 100.

Additionally, when a push request for a cache line in which useless information is in a useless state is received, the cache controller 230 may change the useless information of the cache line to store the data subject to the push request into a useful state. In other words, when it is necessary to perform a writeback operation on data written in the cache line by the push request, the cache controller 230 may change useless information of the cache line to store the data subject to the push request into a useful state.

The cache controller 230 may receive, from the processor 300 or other external devices, a read request for data stored in the stack area 211. When the read request for the data stored in the stack area 211 is received, the cache controller 230 may set read data based on the useless information of a cache line in which the data subject to the read request is stored.

In an embodiment, when the useless information of the cache line in which the data subject to the read request is stored is in a useless state, the cache controller 230 may set dummy data as read data. For example, the cache controller 230 may output dummy data different from the data subject to the read request when the data is in the useless state. When the useless information of the cache line in which the data subject to the read request is stored is in a useless state, it may indicate that the data subject to the read request has already been popped by a pop request of the processor 300. In other words, when the useless information of the cache line in which the data subject to the read request is stored is in a useless state, it may indicate that the read request is for data no longer used by the processor 300. In this case, the cache controller 230 does not set read data to the data subject to the read request, but sets the read data to the dummy data. As described above, by setting the read data to the dummy data, data discarded in the cache 200 by another external device may be prevented from being hacked or accessed by an unauthorized party. Accordingly, data security performance of the cache 200 may be increased.

In another embodiment, when the useless information of the cache line in which the data subject to the read request is stored is in a useful state, the cache controller 230 may set read data to data stored in the cache line. When the useless information of the cache line in which the data subject to the read request is stored is in the useful state, it may indicate that the data subject to the read request is data that has not been popped by a pop request of the processor 300. In other words, when the useless information of the cache line in which the data subject to the read request is stored is in the useful state, it may indicate that the read request is for data to be used by the processor 300. Accordingly, the cache controller 230 may set the read data to the data subject to the read request.

The cache controller 230 may perform an evict operation or a flush operation on a cache line.

In an embodiment, when the evict operation or the flush operation is to be performed on a cache line, and useless information corresponding to the cache line is in a useless state and dirty information of the cache line subject to the evict operation or the flush operation is in a dirty state, the cache controller 230 changes valid information of the cache line subject to the evict operation or the flush operation into an invalid state. In other words, when an evict operation or a flush operation is performed on a cache line in which useless information is in a useless state, the cache controller 230 changes valid information of the cache line to an invalid state without performing a writeback operation, even when dirty information of the cache line is in a dirty state. As described above, because an unnecessary operation, such as writeback, is not performed on popped data based on the useless information, performance of the cache may be increased.

In contrast, when the evict operation or the flush operation is to be performed on a cache line, and the useless information corresponding to the cache line is in a useful state and dirty information of the cache line subject to the evict operation or the flush operation is in a dirty state, the cache controller 230 changes valid information of the cache line subject to the evict operation or the flush operation to an invalid state. In other words, when an evict operation or a flush operation is performed on a cache line in which useless information is in a useful state and dirty information of the cache line is in a dirty state, the cache controller 230 may perform a writeback operation and change valid information of the cache line to an invalid state. For example, if the cache line stores second variable data of a variable, the main memory 100 stores first variable data of the variable, the writeback operation may overwrite the variable of the main memory 100 with the second variable data.

The cache 200 according to the inventive concept as described above may process a request for data stored in a stack area 211 based on useless information, so that an unnecessary operation is not performed on popped data, thereby providing increased performance. In addition, when a read request for the popped data is received, dummy data may be output, and thus, increased security function may be provided.

Figure 4:
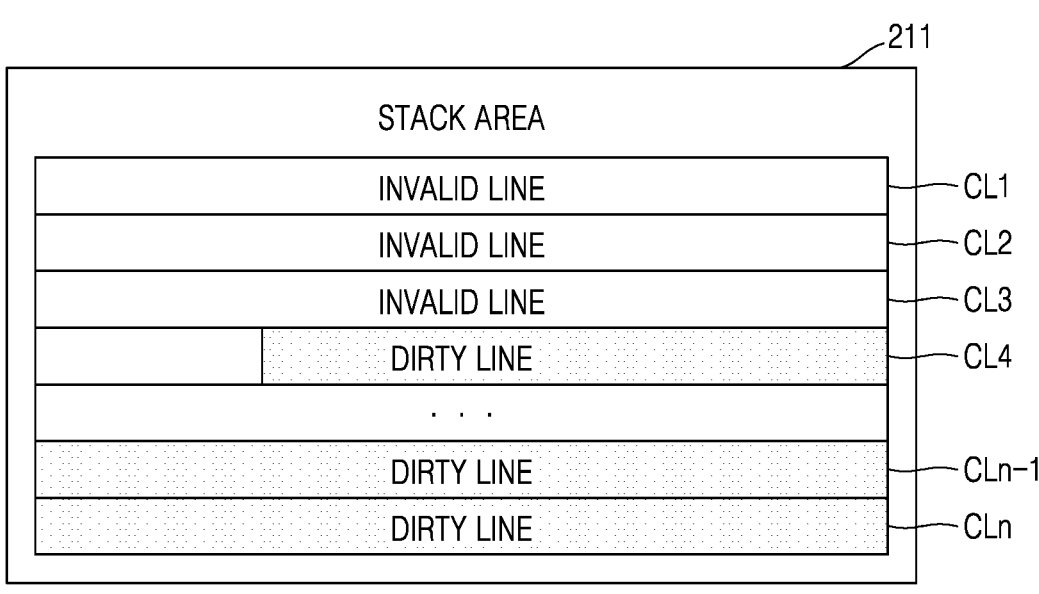
FIG. 4 is a diagram illustrating state changes of a plurality of cache lines of a data memory when a cache receives a push request, according to an embodiment.
Figure 4:
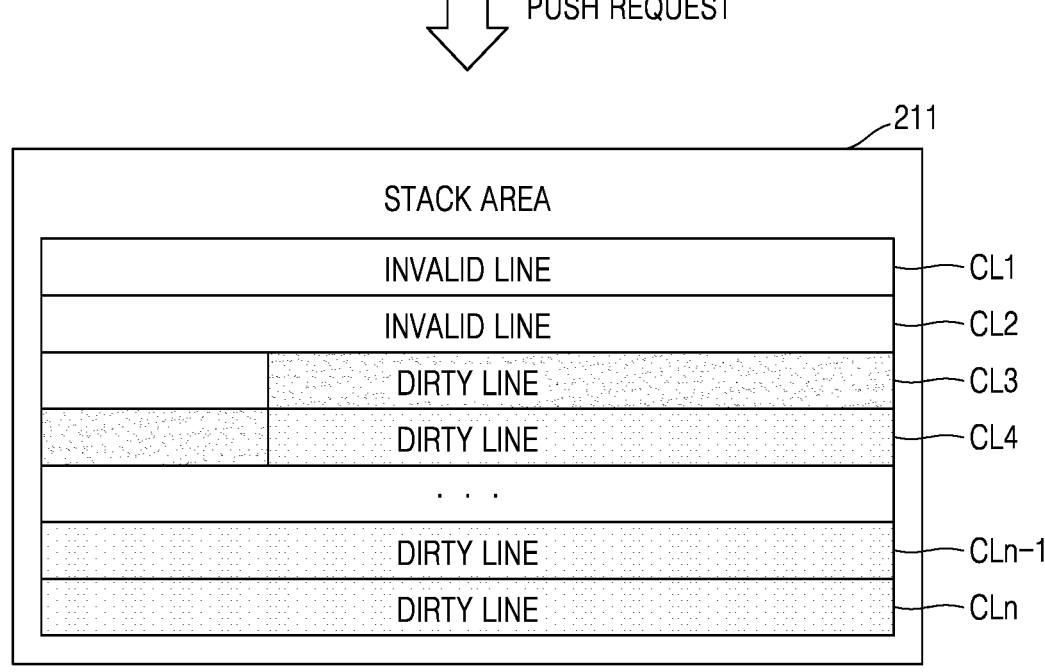

FIG. 4 is a diagram illustrating state changes of a plurality of cache lines of a data memory when a cache receives a push request, according to an embodiment.

Referring to FIG. 4, state changes of a plurality of cache lines included in the stack area 211 when a push request is received from the processor 300 may be identified. At an upper end of FIG. 4, states of the plurality of cache lines included in the stack area 211 before the push request is received are shown, and at a lower end of FIG. 4, states of the plurality of cache lines included in the stack area after the push request is received are shown.

First to third cache lines CL1 to CL3 from among the plurality of cache lines included in the stack area 211 before the push request is received are invalid lines, in which valid information is in an invalid state. In this case, useless information and dirty information of the invalid lines may have any value. Fourth to nth cache lines CL4 to CLn may be dirty lines in which valid information is in a valid state and dirty information is in a dirty state. In this case, useless information of the dirty lines may be in a useful state.

In the state described above, a push request for data to be stored throughout the third and fourth cache lines CL3 and CLA is received from the processor 300.

The data subject to the push request may be stored throughout the third and fourth cache lines CL3 and CL4.

The fourth cache line CL4 is a dirty line because pre-stored data is present, and thus, information stored in a tag entry corresponding to the fourth cache line CL4 is not changed.

Since the third cache line CL3 is an invalid line in which stored data is not present, valid information stored in a tag entry corresponding to the third cache line CL3 is changed from an invalid state to a valid state. In addition, dirty information stored in the tag entry corresponding to the third cache line CL3 may be set to a dirty state, and useless information of the third cache line CL3 is set to a useful state. Accordingly, the third cache line CL3 may be a dirty line.

Figure 5:
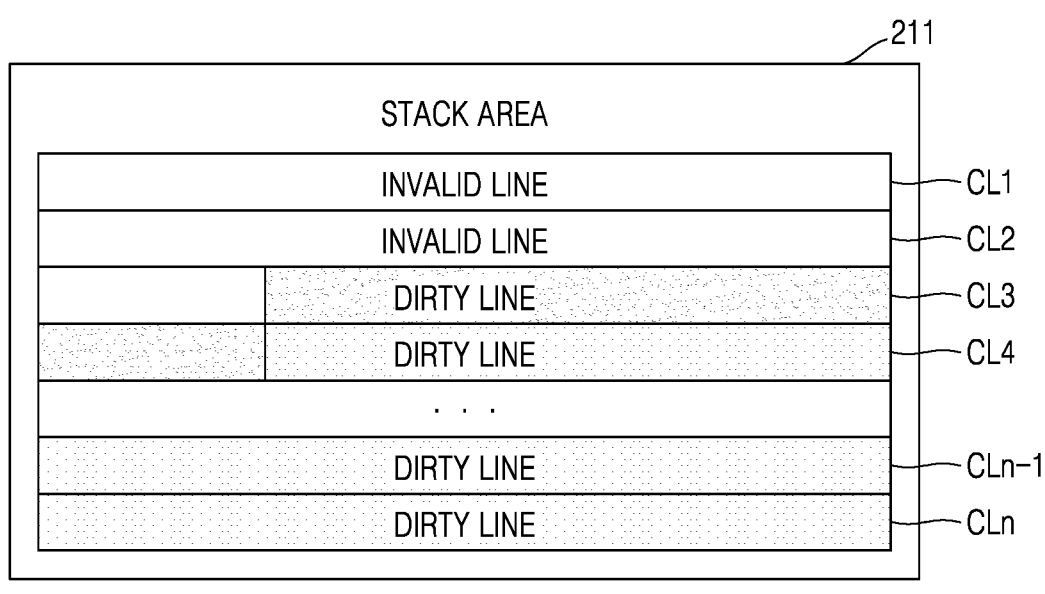
FIG. 5 is a diagram illustrating state changes of a plurality of cache lines of a data memory when a cache receives a pop request, according to an embodiment.
Figure 5:
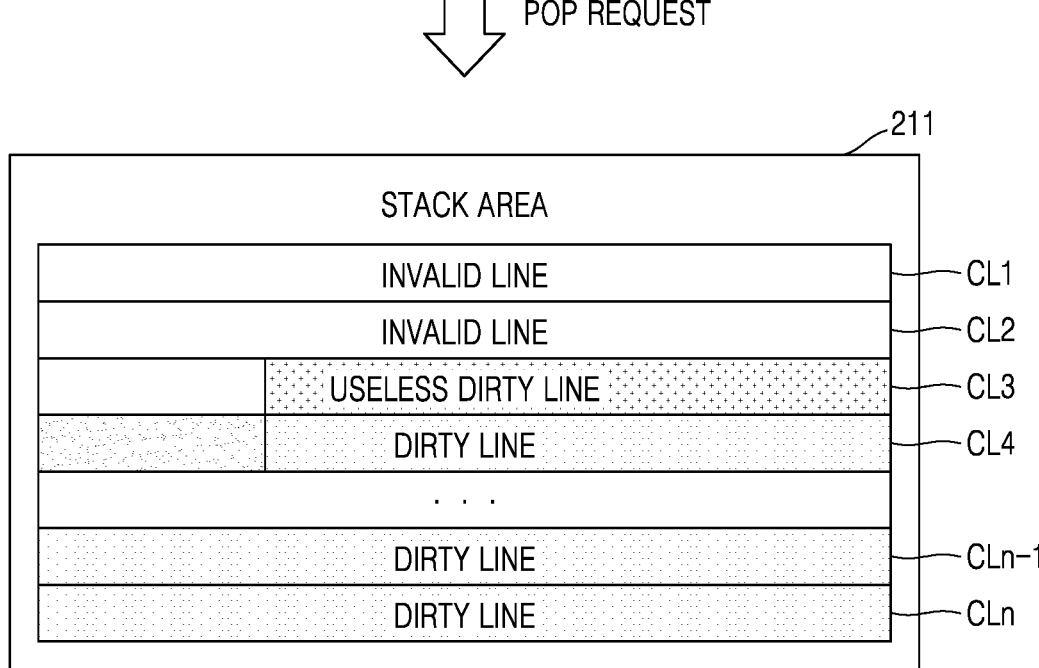

FIG. 5 is a diagram illustrating state changes of a plurality of cache lines of a data memory when a cache receives a pop request, according to an embodiment.

Referring to FIG. 5, state changes of a plurality of cache lines included in a stack area 211 when a pop request is received from the processor 300 when states of the plurality of cache lines included in the stack area 211 are the state shown at the lower end of FIG. 4 may be identified. At an upper end of FIG. 5, states of the plurality of cache lines included in the stack area 211 before the pop request is received (the same state as the state shown at the lower end of FIG. 4) are shown, and at a lower end of FIG. 5, states of the plurality of cache lines included in the stack area after the pop request is received are shown.

In the state as in the upper end of FIG. 5, a pop request for data stored in the third cache line CL3 is received from the processor 300.

The data subject to the pop request may be output to the processor 300.

Since the data stored in the third cache line CL3 is popped, useless information of the third cache line CL3 is changed from a useful state to a useless state. For example, useless information in an entry of the tag entries 221 for the third cache line CL3 may be set to the useless state. Accordingly, the third cache line CL3 may be a useless dirty line in which useless information is in a useless state and dirty information is in a dirty state.

In the third cache line CL3 as described above, although the data subject to the pop request is stored, useless information is in a useless state, and thus, a writeback is not performed on the third cache line CL3. In addition, even when a read request for the third cache line CL3 is received, the data stored in the third cache line CL3 is not transferred. Accordingly, performance and security of the cache 200 may be increased.

Figure 6:
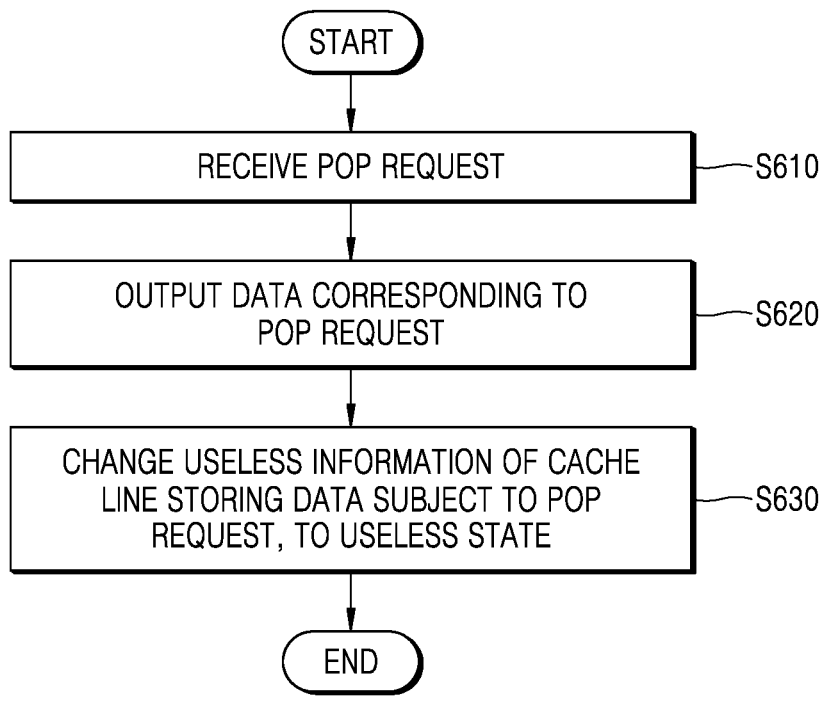
FIG. 6 is a flowchart of an operating method when a cache receives a pop request, according to an embodiment.

FIG. 6 is a flowchart of an operating method when the cache 200 receives a pop request, according to an embodiment.

Referring to FIG. 6, in operation S610, the cache 200 receives a pop request from the processor 300.

In operation S620, the cache 200 outputs data corresponding to the pop request. In other words, the cache 200 may output data stored in a cache line of the stack area 211 to the processor 300 in response to the pop request received from the processor 300.

In operation S630, the cache 200 changes useless information of the cache line storing the data subject to the pop request, to a useless state. The cache 200 may change useless information included in a tag entry of the tag memory 220 corresponding to the cache line storing the data subject to the pop request, to a useless state.

When the cache 200 changes the useless information of a cache line storing data subject to a pop request, to a useless state, an unnecessary operation, such as writeback, may not be performed on the popped data based on the useless information.

Figure 7:
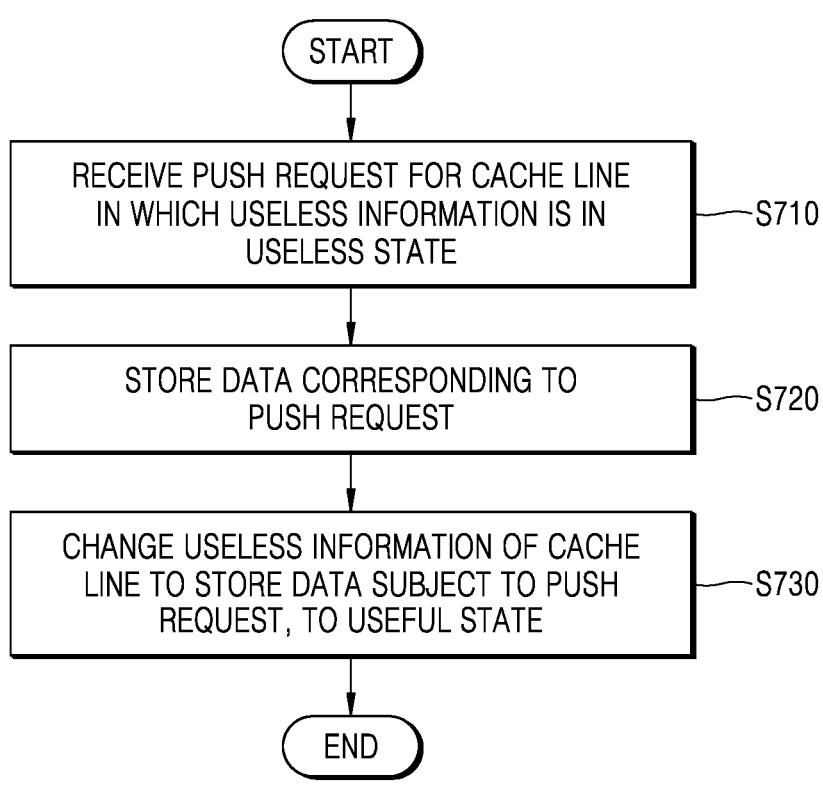
FIG. 7 is a flowchart of an operating method when a cache receives a push request for a cache line that is in a useless state, according to an embodiment.

FIG. 7 is a flowchart of an operating method when the cache 200 receives a push request for a cache line that is in a useless state, according to an embodiment.

Referring to FIG. 7, in operation S710, the cache 200 receives, from the processor 300, a push request for a cache line in which useless information is in a useless state.

In operation S720, the cache 200 stores data corresponding to the push request. In other words, the cache 200 may store the push-requested data in a stack area 211 in response to the push request received from the processor 300.

In operation S730, the cache 200 may change useless information of the cache line to store the data subject to the push request, to a useful state. The cache 200 may change useless information included in a tag entry of the tag memory 220 corresponding to the cache line storing the data subject to the push request, to a useful state. Accordingly, a writeback operation may be performed on the data written in the cache line after the push request occurs.

Figure 8:
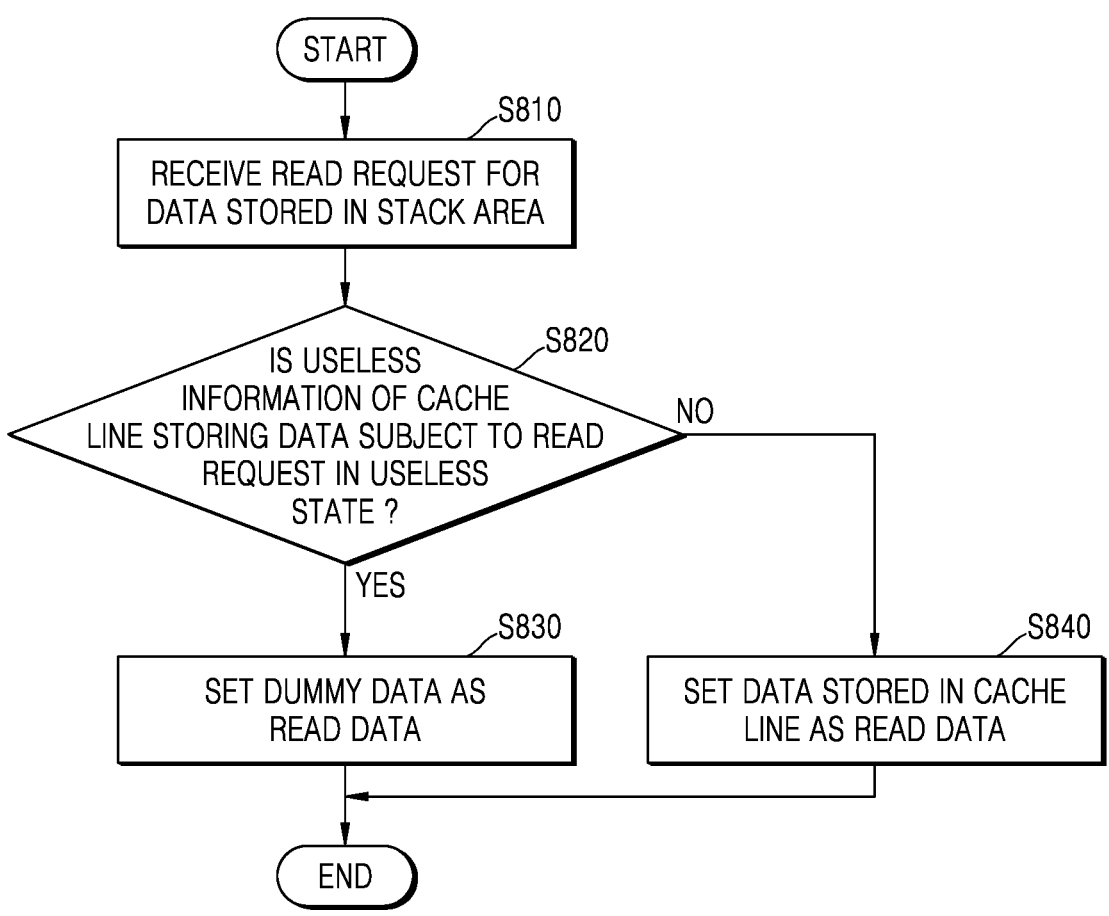
FIG. 8 is a flowchart of an operating method when a read request for a stack area of a cache is received, according to an embodiment.

FIG. 8 is a flowchart of an operating method when a read request for a stack area 211 of the cache 200 is received, according to an embodiment.

Referring to FIG. 8, in operation S810, the cache 200 receives a read request for data stored in the stack area 211.

In operation S820, the cache 200 determines whether useless information of a cache line storing the data subject to the read request is in a useless state.

When the useless information of the cache line storing data subject to the read request is in the useless state, the cache 200 sets dummy data as read data, in operation S830. For example, the cache 200 may output the dummy data as the read data that is different from the data subject to the read request when the useless information is in the useless state. When the dummy data is set to the read data, hacking by other devices using data discarded in the cache 200 may be prevented.

In contrast, when the useless information of the cache line storing the data subject to the read request is in a useful state, the cache 200 sets the data stored in the cache line as read data, in operation S840. For example, the cache 200 may output the data subject to the read request as the read data when the useless information is in the useful state.

Figure 9:
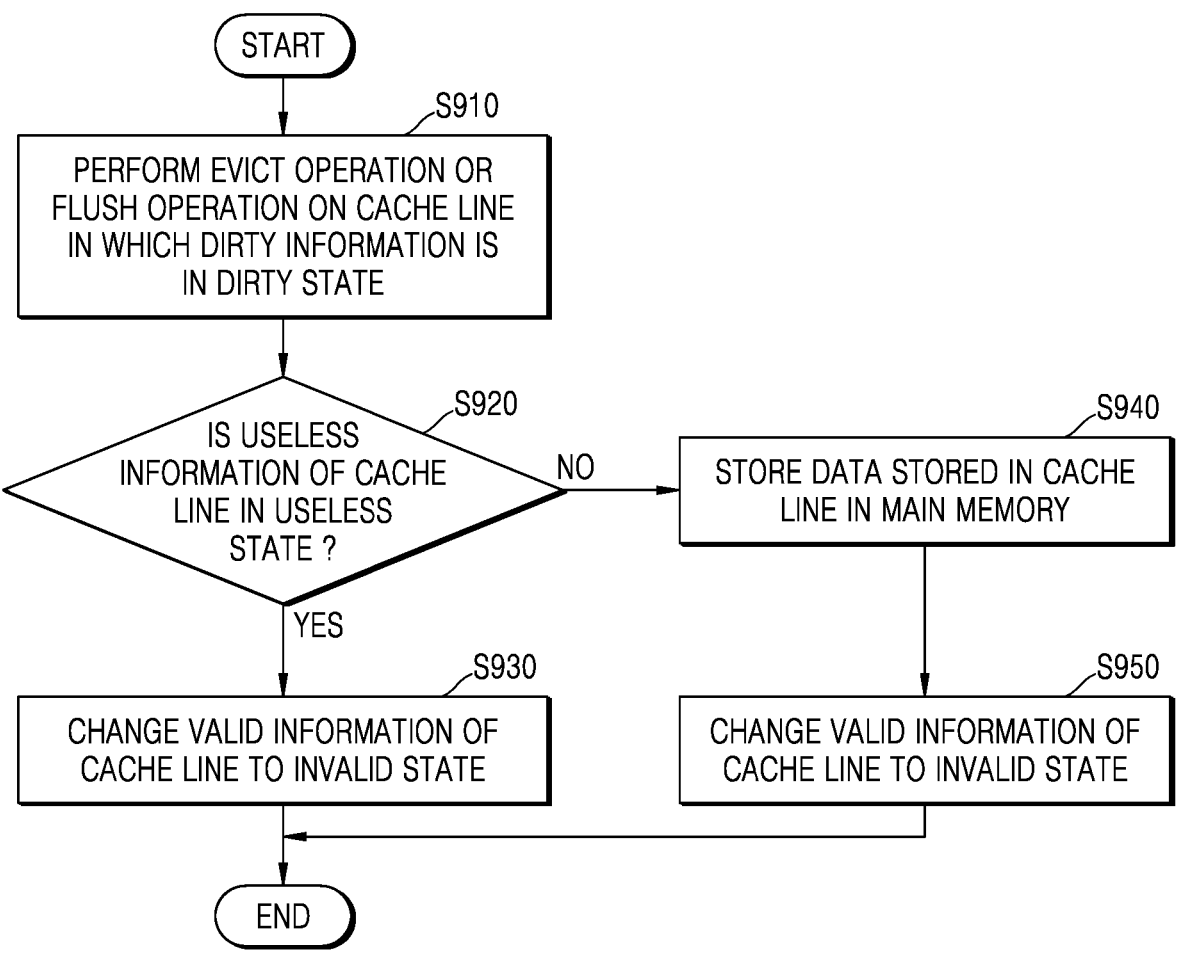
FIG. 9 is a flowchart of an operating method when a cache performs an evict operation or a flush operation, according to an embodiment.

FIG. 9 is a flowchart of an operating method when the cache 200 performs an evict operation or a flush operation, according to an embodiment.

Referring to FIG. 9, in operation S910, the cache 200 performs an evict operation or a flush operation on a cache line in which dirty information is in a dirty state.

In operation S920, the cache 200 determines whether useless information of the cache line is in a useless state.

When the useless information of the cache line is in the useless state, the cache 200 changes valid information of the cache line to an invalid state, in operation S930. In other words, even when the dirty information of the cache line is in a dirty state, the cache 200 changes the valid information of the cache line to an invalid state without performing a writeback operation, thereby increasing performance of the cache 200.

In contrast, when the useless information of the cache line is in a useful state instead of a useless state, the cache 200 stores the data stored in the cache line in the main memory 100, in operation S940. Then, in operation S950, the cache 200 changes the valid information of the cache line to an invalid state.

Figure 10:
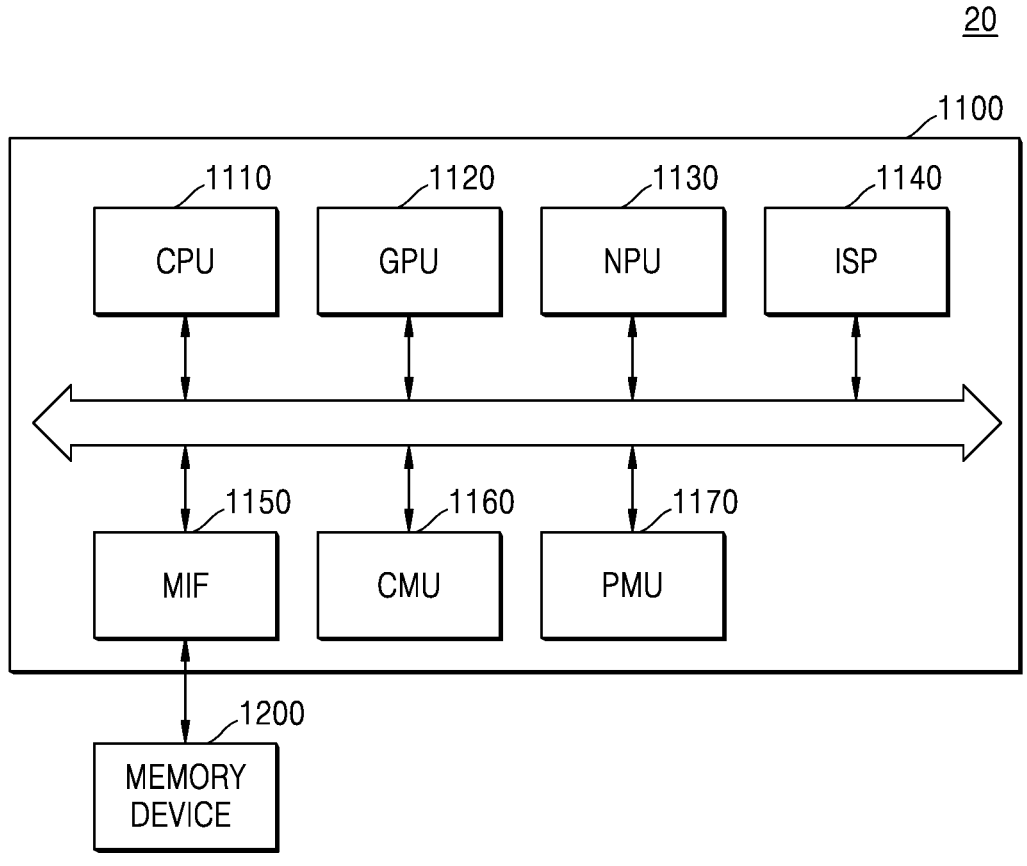
FIG. 10 is a block diagram of a system according to an embodiment.

FIG. 10 is a block diagram of a system 20 according to an embodiment.

Referring to FIG. 10, the system 20 may be implemented in handheld devices, such as mobile phones, smartphones, tablet computers, personal digital assistants (PDAs), enterprise digital assistants (EDAs), digital still cameras, digital video cameras, portable multimedia players (PMPs), personal navigation devices (PDAs), or portable navigation devices, handheld game consoles, or e-books.

The system 20 may include a SoC 1100 and a memory device 1200. The SoC 1100 may include CPUs 1110, graphics processing units (GPUs) 1120, neural processing units (NPUs) 1130, image signal processors (ISPs) 1140, memory interfaces (MIFs) 1150, clock management units (CMUs) 1160, and power management units (PMUs) 1170. The CPU 1110, the GPU 1120, the NPU 1130, the ISP 1140, and the MIF 1150 may be embodiments of the electronic devices described with reference to FIGS. 1 to 9.

The CPU 1110 may process or execute commands and/or data stored in the memory device 1200 in response to a clock signal generated by the CMU 1160.

The GPU 1120 may obtain image data in the memory device 1200 in response to a clock signal generated by the CMU 1160. The GPU 1120 may generate data for an image output through a display device (not shown) from the image data received from the MIF 1150, or may encode image data.

The NPU 1130 may refer to any device that executes a machine learning model. The NPU 1130 may be a hardware block designed to execute a machine learning model. The machine learning model may be a model based on an artificial neural network, a decision tree, a support vector machine, regression analysis, a Bayesian network, a genetic algorithm, etc. An artificial neural network may include, as non-limiting examples, convolution neural networks (CNNs), region with convolution neural networks (R-CNNs), region proposal networks (RPNs), recurrent neural networks (RNNs), stacking-based deep neural networks (S-DNNs), state-space dynamic neural networks (S-SDNNs), deconvolution networks, deep belief networks (DBN), restricted Boltzmann machines (RBMs), fully convolutional networks, long short-term memory (LSTM) networks, and classification networks.

The ISP 1140 may perform a signal processing operation on raw data received from an image sensor (not shown) located outside the SoC 1100 and generate digital data having increased image quality.

The MIF 1150 may provide an interface for the memory device 1200 located outside the SoC 1100. The memory device 1200 may be dynamic random access memory (DRAM), PRAM, resistive random access memory (Re-RAM), or flash memory.

The CMU 1160 may generate a clock signal and provide the clock signal to elements of the SoC 1100. The CMU 1160 may include a clock generation device, such as phase locked loops (PLLs), delayed locked loops (DLLs), and crystals. The PMU 1170 may convert external power to internal power and supply the internal power to the elements to the SoC 1100.

While the inventive concept has been particularly shown and described with reference to embodiments thereof, it will be understood that various changes in form and details may be made therein without departing from the spirit and scope of the following claims.

What is claimed is:

1. A cache comprising:

a data memory including a stack area storing, in a stack structure, data used by an external processor in a plurality of cache lines;

a tag memory for storing a tag entry including useless information indicating whether data stored in a corresponding cache line has been popped; and a cache controller configured to, when a pop request for data stored in the stack area is received, change the useless information of a cache line storing the data subject to the pop request, to a useless state, wherein the cache controller is further configured to, when a push request for the cache line in which the useless information is in the useless state is received, change the useless information of the cache line to store the data subject to the push request, to a useful state.

2. The cache of claim 1, wherein the cache controller is further configured to, when a read request for the data stored in the stack area is received, set read data based on the useless information of the cache line storing the data subject to the read request.

3. The cache of claim 2, wherein the cache controller is further configured to:

when the useless information of the cache line storing the data subject to the read request is in the useless state, set the read data to dummy data different from the data subject to the read request; and when the useless information of the cache line storing the data subject to the read request is in a useful state, set the read data to data stored in the cache line.

4. The cache of claim 1, wherein the tag entry further comprises:

valid information indicating whether the data stored in the corresponding cache line is valid; and dirty information indicating whether the data stored in the corresponding cache line is different from data stored in an external main memory.

5. The cache of claim 4, wherein the cache controller is further configured to, when an evict operation or a flush operation is performed on the cache line in which the dirty information is in a dirty state and the useless information of the cache line subject to the evict operation or the flush operation is in the useless state, change the valid information of the cache line subject to the evict operation or the flush operation to an invalid state.

6. The cache of claim 4, wherein the cache controller is further configured to, when an evict operation or a flush operation is performed on the cache line in which the dirty information is in a dirty state and the useless state of the cache line subject to the evict operation or the flush operation is in a useful state, store, in the external main memory, data stored in the cache line subject to the evict operation or the flush operation and change the valid information to an invalid state.

7. The cache of claim 4, wherein the cache controller is further configured to, when a push request for the stack area is received, change the valid information of a cache line to store data subject to the push request, to a valid state, and change the dirty information of the cache line to store the data subject to the push request, to a dirty state.

8. An operating method of a cache comprising a data memory including a stack area storing data in a stack structure, a tag memory, and a cache controller, the operating method comprising:

receiving, by the cache controller, a pop request from a processor;

changing, by the cache controller, useless information in the tag memory for a cache line of the stack area storing data subject to the pop request, to a useless state;

receiving, by the cache controller, a read request for the data stored in the stack area; and setting, by the cache controller, read data based on useless information of a cache line storing the data subject to the read request, wherein the useless information indicates whether data stored in a corresponding cache line has been popped.

9. The operating method of claim 8, further comprising:

receiving, by the cache controller, a push request for the cache line in which the useless information is in the useless state; and changing, by the cache controller, the useless information of a cache line to store data subject to the push request, to a useful state.

10. The operating method of claim 8, wherein the setting of the read data comprises:

when the useless information of the cache line storing the data subject to the read request is in a useless state, setting, by the cache controller, the read data to dummy data different from the data subject to the read request; and when the useless information of the cache line storing the data subject to the read request is in a useful state, setting, by the cache controller, the read data to data stored in the cache line.

11. The operating method of claim 8, wherein a tag entry of the tag memory comprises:

valid information indicating whether data stored in a cache line corresponding to a tag address is valid; and dirty information indicating whether the data stored in the cache line corresponding to the tag address is different from data stored in a main memory.

12. An electronic device comprising:

a main memory;

a cache; and a processor, wherein the cache includes:

a data memory including a stack area storing, in a stack structure, data used by the processor in a plurality of cache lines;

a tag memory for storing a tag entry including information about the data stored in the stack area; and a cache controller configured to process a request for the data stored in the stack area based on the tag entry, the tag entry includes useless information indicating whether data stored in a corresponding cache line has been popped, the cache controller is further configured to, when a pop request for the data stored in the stack area is received, change the useless information of a cache line storing the data subject to the pop request, to a useless state, wherein the tag entry further comprises:

valid information indicating whether the data stored in the corresponding cache line is valid; and dirty information indicating whether the data stored in the corresponding cache line is different from data stored in the main memory, and wherein the cache controller is further configured to, when an evict operation or a flush operation is performed on a cache line in which the dirty information is in a dirty state and the useless information of the cache line subject to the evict operation or the flush operation is in the useless state, change the valid information of the cache line subject to the evict operation or the flush operation, to an invalid state.

13. The electronic device of claim 12, wherein the cache controller is further configured to, when a push request for the cache line in which the useless information is in the useless state is received, change the useless information of the cache line to store data subject to the push request, to a useful state.

14. The electronic device of claim 12, wherein the cache controller is further configured to, when a read request for the data stored in the stack area is received, set read data based on the useless information of a cache line storing the data subject to the read request.

15. The electronic device of claim 14, wherein the cache controller is further configured to:

when the useless information of the cache line storing the data subject to the read request is in a useless state, set the read data to dummy data different from the data subject to the read request; and when the useless information of the cache line storing the data subject to the read request is in a useful state, set the read data to data stored in the cache line.

16. The electronic device of claim 12, wherein the cache controller is further configured to, when an evict operation or a flush operation is performed on a cache line in which the dirty information is in a dirty state and the useless information of the cache line subject to the evict operation or the flush operation is in a useful state, store, in the main memory, data stored in the cache line subject to the evict operation or the flush operation, and change the valid information to an invalid state.

\* \* \* \* \*